June 5, 1923.
D. S. BEEBE
1,457,491
TOOL FOR CUTTING GLASS WHILE IN A PLASTIC STATE
Filed Jan. 8, 1921
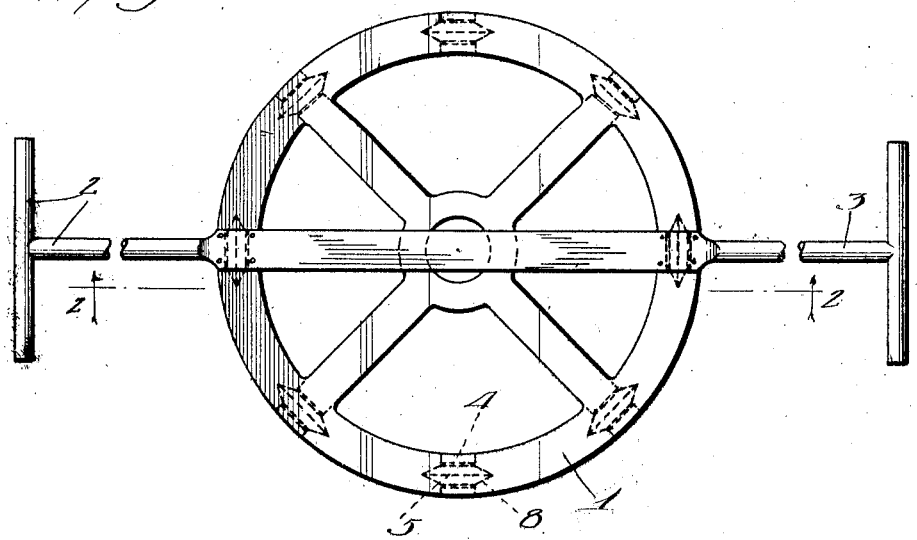
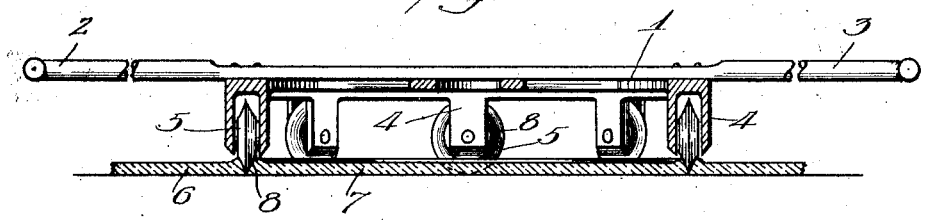
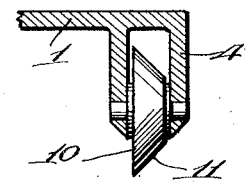
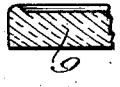
Inventor:
D. S. Beebe
By Chamberlin & Brendenreich
Attys Patented June 5, 1923.

1,457,491

UNITED STATES PATENT OFFICE.

DANIEL S. BEEBE, OF OAK PARK, ILLINOIS, ASSIGNOR TO THE VITROLITE COMPANY, OF PARKERSBURG, WEST VIRGINIA, A CORPORATION OF WEST VIRGINIA.

TOOL FOR CUTTING GLASS WHILE IN A PLASTIC STATE.

Application filed January 8, 1921. Serial No. 435,791.

*To all whom it may concern:*

Be it known that I, DANIEL S. BEEBE, a citizen of the United States, residing at Oak Park, county of Cook, State of Illinois, have invented a certain new and useful Improvement in Tools for Cutting Glass While in a Plastic State, and declare the following to be a full, clear, and exact description of the same, such as will enable others skilled in the art to which it pertains to make and use the same, reference being had to the accompanying drawings, which form a part of this specification.

My invention has for its object to produce a simple and novel tool by means of which discs to be used as table tops and for other purposes can accurately and conveniently be cut out of a cast slab or sheet of glass while the latter is still in a plastic condition.

The various features of novelty whereby my invention is characterized will hereinafter be pointed out with particularity in the claims; but, for a full understanding of my invention and of its object and advantages, reference may be had to the following detailed description, taken in connection with the accompanying drawing, wherein:

Figure 1 is a top plan view of the tool, portions of the handle being broken away;

Fig. 2 is a section taken approximately on line 2—2 of Fig. 1, illustrating the tool in the act of cutting through a slab of glass;

Fig. 3 is a detail on an enlarged scale showing a fragment of the tool having a modified form of cutting wheel; and Fig. 4 is a section through the peripheral portion of a disc cut out by a tool having a wheel shaped as shown in Fig. 3.

Referring to the drawing, 1 represents a light frame, preferably in the form of a ring having radial stiffening arms. Projecting radially from diametrically opposed points of the frame are handles, 2 and 3, which may conveniently be formed in one piece extending across the top of the frame and secured thereto. On the under side of the frame are a series of downwardly-opening jaws, 4, arranged in a circle having the same center as the frame itself. In each jaw is journaled a cutting wheel, 5, rotatable about an axis which is horizontal and forms a radius of the aforesaid circle; the parts being so proportioned that the cutting edges of all of the wheels are at exactly the same distance from the center of the circle whereby, when the tool is turned about a stationary vertical axis passing through the center of the circle, all of the wheels will follow in the same track.

In using the tool, it is simply set upon a plastic cast slab of glass, indicated at 6 in Fig. 2, the support of the tool being through the cutting edges. Then, by grasping the handles and turning the tool through an angle somewhat greater than the angle between consecutive cutting wheels in the series, and at the same time exerting a downward pressure on the handles, a perfect disc, 7, will be cut out of the slab of glass. The tool is then moved along the slab and the operation is repeated.

Whenever plastic glass is cut by pressing a tool into the same, the glass which is displaced to make way for the tool moves not only laterally but also in the upward direction so as to form a ridge or bead on each side of the line of cutting. The shape of the short cylindrical surface forming the bounding edges of the two pieces separated by a cutter will depend upon the shape of the cutter. Therefore my improved tool will produce a disc having an upwardly-projecting ridge or bead at the margin, and an edge wall whose shape will depend upon the shape of the cutting wheel. If it be desired to produce a disc which will be a shallow frustum of a cone, the cutting wheels may be beveled, as indicated at 8, on the inner sides, as illustrated in Figs. 1 and 2. If it be desired to form a disc having a cylindrical edge wall as in the fragment, 9, shown in Fig. 4, the cutting wheels may be made as shown in Fig. 3 that is, have plane inner faces, 10, extending at right angles to the axis of rotation and beveled outer faces, 11, to form a chisel-like cutting edge.

It will be seen that a tool such as I have devised is extremely simple, can be carried about easily from one place to another, and is located in operative relation to the work by simply setting it down on the work at the place where a disc is to be cut out. The frame may of course take any suitable form but, by making it as shown, with an open center, the two workmen who manipulate the tool from opposite sides of the casting table are able to see just what the tool is doing, both on the outer side of the cutting line and on the inner side thereof.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A cutting tool for glass comprising a frame, and a series of small cutting wheels mounted in a circle on the under side of the frame so as to rotate about axes forming radii of said circle and constitute the means for supporting the tool on the work.

2. A cutting tool for glass comprising a flat frame, a series of small cutting wheels mounted in a circle on the under side of the frame so as to rotate about axes forming radii of said circle, a large portion of the frame within the area bounded by said circle being open so as to permit the cutting wheels to be viewed through the top of the frame.

3. A cutting tool for glass comprising a frame in the form of a ring having radial stiffening arms extending across the same, and a series of small cutting wheels mounted in a circle on the under side of the ring so as to rotate about axes forming radii of said circle.

4. A cutting tool for glass comprising a frame, a series of small cutting wheels mounted in a circle on the under side of the frame so as to rotate about axes forming radii of said circle, and handles projecting from said frame radially of said circle and at diametrically opposed points on said circle.

5. A cutting tool for glass comprising a ring, a series of small cutting wheels mounted in a circle on the under side of the ring so as to rotate about axes forming radii of said circle, and handles projecting from said ring for turning the same.

6. A cutting tool for glass comprising a ring, and a series of small cutting wheels mounted in a circle on the under side of the ring so as to rotate about axes forming radii of said circle and adapted to constitute the sole means of contact between the tool and the work and the means for supporting the tool.

In testimony whereof, I sign this specification.

DANIEL S. BEEBE.